(12) United States Patent
Amero et al.

(10) Patent No.: US 6,504,625 B1
(45) Date of Patent: Jan. 7, 2003

(54) SYSTEM AND METHOD FOR PRINT ANALYSIS

(75) Inventors: Bernard A. Amero, Nanuet, NY (US); Roy Rosenberger, Appleton, WI (US)

(73) Assignee: Champion International Company, Stamford, CT (US)

( * ) Notice: Subject to any disclaimer, the term of this patent is extended or adjusted under 35 U.S.C. 154(b) by 0 days.

(21) Appl. No.: 09/220,669

(22) Filed: Dec. 24, 1998

(51) Int. Cl.⁷ ............................. G06K 15/00; G06K 9/00
(52) U.S. Cl. ........................................ 358/1.9; 382/163
(58) Field of Search ............................. 358/1.9, 1.15, 358/500, 504; 382/163, 164

(56) References Cited

U.S. PATENT DOCUMENTS

| | | | | |
|---|---|---|---|---|
| 3,887,762 A | * | 6/1975 | Uno ................................ | 178/6 |
| 3,976,383 A | * | 8/1976 | Olsen .......................... | 356/166 |
| 5,003,616 A | * | 3/1991 | Orita ............................ | 382/41 |
| 6,052,809 A | * | 4/2000 | Bowden ...................... | 714/738 |
| 6,104,438 A | * | 8/2000 | Saito ........................... | 348/587 |
| 6,130,685 A | * | 10/2000 | Matsubara ................... | 347/41 |
| 6,275,600 B1 | * | 8/2001 | Banker ........................ | 382/112 |

OTHER PUBLICATIONS

Rosenberger, Roy, "A Method for Measuring Ink–Jet Wicking Using a Document Scanner and Personal Computer", TAPPI Journal, vol. 81: No. 3, p 71–81.

Kipman, Yair, "Image Quality Metrics for Printers/Plotters": IS&T's NIP 12: International Conference on Digital Printing Technologies, p214–219.

Chaplin, Derek, "Image Analysis: A Powerful Tool To Pinpoint Defects and Gauge Print Quality", Paper Age, Jun. 1998, p 30–31.

Tanaka, Y and Abe, T.; "Quantitative Analysis of Print Quality features," Journal of Imaging Technology, vol. 13, No. 6, Dec. 1987; pp. 202–207.

Wouch, G. & Serafano, J., "Applications of Image Analysis To Printing," part I of II, What is Image Analysis? Ink World, Mar. 1997, pp. 24–28.

Wouch, G. & Serafano, J., "Applications of Image Analysis To Printing," Part II of II, An Application of Image Analysis in Rotogravure Ink World, Apr., 1997, pp. 16–22.

DIS–13660 Version AA, "Office equipment—Measurement of Image Quality Attributes For Hardcopy Output—Binary Monochrome Text and Graphic Images", Jun. 20, 1996.

Spencer, P. & Schwartzwald, D., "Automatic Print Quality Measurement Using a Scanner," IS&T's NIP12: Intl. Conf. on Digital Printing Technologies, pp. 156–158.

(List continued on next page.)

Primary Examiner—Jerome Grant, II
(74) Attorney, Agent, or Firm—Pillsbury Winthrop

(57) ABSTRACT

A system and method is disclosed for analyzing a test pattern printed by a printing device onto a substrate to determine the printing properties of the substrate. The test pattern includes (i) a first cell having a background of a first color and a pattern of a second color and (ii) a second cell having a background of the second color and a pattern of the first color. The patterns each include a plurality of dots that are randomly positioned within each pattern. Prior to analyzing the test pattern, the first and second colors are differentiated from each other using color-band and threshold selection techniques. A variety of print defect indices are disclosed for analyzing the test pattern including a gain index, a raggedness index, a circularity index, and a non-uniformity index. The results of analysis can be calculated as a single value for a simple and convenient representation of the print quality of the substrate.

19 Claims, 7 Drawing Sheets

OTHER PUBLICATIONS

Ohno, S. et al, Image Quality of Digital Photography Prints: 1. Color Quality of Thermal Dye–Transfer Prints, Journal of Imaging Technology, vol. 42, No. 3, May/Jun. 1998, pp. 269–275.

Osby, D., "Optimizing sheet print quality," Pima's Papermaker, Oct. 1998, pp. 54–55.

Kowalczyk G., & Trksak, R., "Image analysis of ink–jet quality for multi use office paper," TAPPI Journal, vol. 81, No. 10, pp 181–190.

Saarelma, H., Oittinen, P., "A Method for Measuring the Quality of a Digitally Printed Image", Graphi Arts in Finland (1997), pp 8–11.

Gavrik, Vitali V., "Non–Information Aspects of Naturalness Rendering". IS&T,s NIP 13: 1997 International Conference on Digital Printing Technologies, pp 5900–594.

Buczynski, L., "Special Print Quality Problems of Ink Jet Printers", IS&T's NIP 13: 1997 International Conference on Digital Printing Technologies, pp 638–644.

Kipman, Yair "Motion–based vision system" Vision Systems Design, 9/96.

Tse, M., Forrest, D. & Briggs, J. "Automated Print Quality Analysis for Digital Printing Technologies" Pan–Pacific Imaging Conference 7/98.

Tse, M., Forrest, D. & She, K., "Use of an Automated Print Quality Evaluation System as a Failure Analysis Tool in Electrophotography" IS&T's Eleventh International Congress on Advances in Non–Impact Printing Technologies, 10/95.

Tse, M., "Automated Print Quality Analysis: Principles and Applications" © 1998 Quality Engineering Associates, Inc., pp 1–30.

Tse, M., "IAS–1000 Print Quality Evaluation System" © 1997 Quality Engineering Associates, Inc.

"Automated Image Quality Tests for Media", Image Xpert™, KDY, Inc., Sections 1, 2 and 3 Application Notes Version 2.01. (1990).

"Automated Image Quality Tests for Media", Image Xpert™, KDY, Inc., Sections 1, 2 and 3 Application Notes Version 2.03. (1990).

"Automated Image Quality Tests for Media Evaluation", image Xpert™, KDY, Inc., Sections 1, 2 and 3 Version 2.04.

Visilog; Image Processing & Software.

Hewlett Packard Paper Acceptance Criteria For HP Deskjet 500C, 550C & 560C Printers; pp 1–32. (Jul. 1994).

Bulletin 8000; Precision Resolution Targets, brochure by Gurley Precision Intruments.

MSU–2000, brochure by Applied Vision Systems, Inc.

Image Pro "The Proven Solution", brochure by Media Cybernetics (1995).

Global Lab., Image Processing and Analysis Software for Microsoft® Windows™, brochure by Data Translation (1990).

"Precision Printing", brochure by Xerox.

Verity IA, Image Analysis—web site http://www.verityia.com/.

Verity IA, "The Ultimate in Image Analysis Quality Control Tools for the Mill and Research Lab".

Rosenberger, Roy, "Non–Uniformity" (Jun. 15, 1997).

Noesis Vision "Sample applications using Visilog"—web site—http://www.noesisvision.com/.

Pira, "Scanner Measurement Systems (SMS)".

* cited by examiner

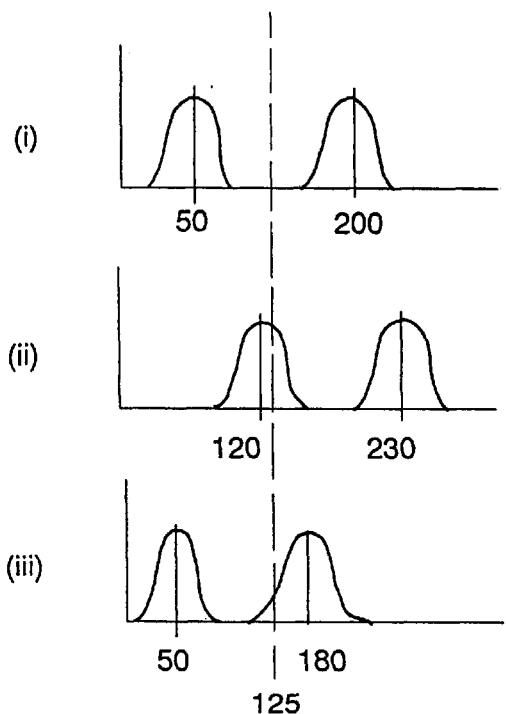
FIG. 7(a)
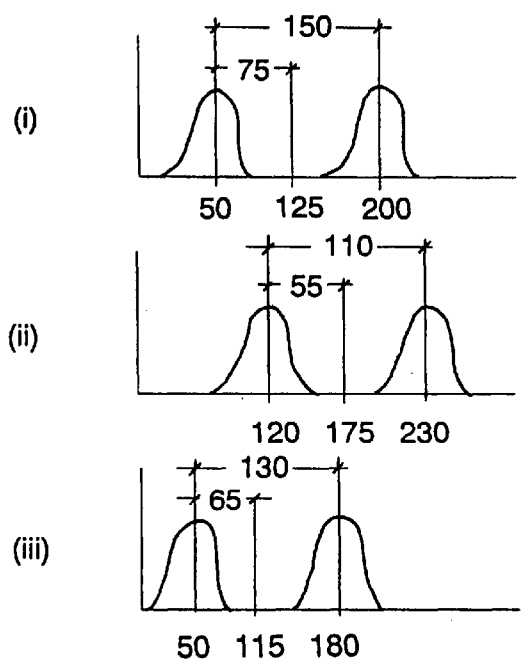
FIG. 7(b)
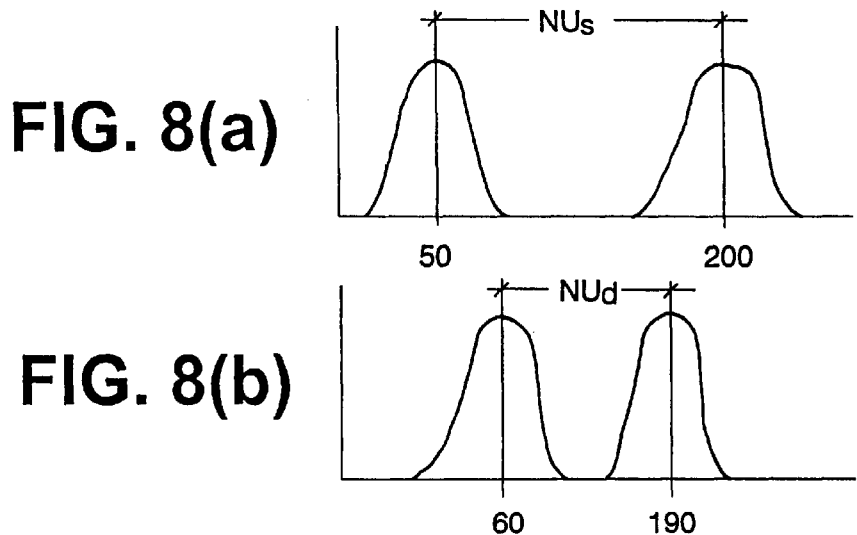
FIG. 8(a)
FIG. 8(b)

SYSTEM AND METHOD FOR PRINT ANALYSIS

BACKGROUND OF THE INVENTION

1. Field of the Invention

The present invention relates generally to a system and method for analyzing the printing properties of a substrate, and more particularly, to a system and method for analyzing a test pattern printed by a printing device to determine the printing properties of a substrate.

2. Background of the Related Art

The evaluation of the printing properties of a substrate, for example, a paper sheet, traditionally has involved the manual evaluation of printed images on a substrate by highly trained technicians. Due to human involvement, manual evaluation techniques tend to be quite subjective, thus causing a lack of consistency between any two or more evaluations of the same printed image. This is true whether the evaluation is performed by one or more technicians. In addition, the process of manually evaluating printed images is time consuming and, consequently, expensive.

In an attempt to eliminate the subjectivity inherent in manually evaluating printing properties of a substrate, a number of standard test patterns have been developed. The test patterns are typically designed to magnify expected paper deficiencies. The test patterns are advantageous because they eliminate the need for a technician to rely solely on the printed image in his evaluation. For example, if a well known Graphic Arts Technical Foundation (GATF) dot-growth test pattern is printed on a substrate and a predetermined amount growth occurs, portions of the test pattern visibly merge. Wile the standard test patterns have improved the evaluation of printing properties of a substrate to a limited extent, some subjectivity still remains and, therefore, the results remain prone to error.

More recently, computer-based print analysis systems have been developed. The computer-based systems have eliminated a number of problems associated with the manual evaluation techniques. In particular, because the computer-based systems operate automatically according to software instructions, the subjective nature of the manual evaluation techniques has been virtually eliminated. In addition, the amount of time in which it takes to evaluate printing properties has been substantially reduced.

One such print analysis system available for evaluating the printing properties of a substrate is ImageXpert™ (KDY Inc., Nashua, N.H.). ImageXpert™ applies algorithms embodied in print analysis software to evaluate test patterns in order to quantitatively measure the printing properties of a substrate. The software carries out a number of tests on standard test patterns, including assessing dot quality, line quality, edge sharpness, and feature resolution. Although automated systems such as ImageXpert™ have improved results obtained in evaluating the printing properties of substrates, there are several problems with these prior art computer-based systems.

For example, existing printing property analysis systems evaluate the test patterns in a one-dimensional manner. More specifically, these prior art systems typically evaluate only overall growth of a test pattern printed on a substrate. Importantly, however, the systems do not consider multi-dimensional growth of a printed test pattern. More specifically, existing print analysis systems do not consider: (i) the change of a test pattern's area through wicking of ink into the substrate; and (ii) the change of a test pattern's area through bleed occurring between contiguously printed inks. Accordingly, these prior art print analysis systems tend to overlook certain important defects due to multi-dimensional growth.

Also, because test patterns must be scanned into a computer which supports print analysis software, errors may be introduced into the test patterns due to the rectilinear geometry of most standard test patterns in use. That is, misalignment of the straight line edges of standard test patterns with the scanner heads of scanners tend to introduce aliasing errors that affect the results.

The above problems may be exacerbated by the fact that the printed test patterns are often printed on printers driven by printer drivers which introduce additional variables not accounted for in print analysis software, Thus, the data that is analyzed by the print analysis software may not be an accurate representation of the original test patterns.

In view of the above, there is clearly a need in the art for an improved method and system for evaluating the print quality of a printing device which solves the foregoing problems.

SUMMARY OF THE DISCLOSURE

The subject invention is directed to a novel and unique system and method for print analysis. The system and method is used for analyzing a test pattern printed by a printing device onto a substrate to determine the printing properties of the substrate.

A system is disclosed for determining print defects of a test pattern formed on a substrate by a printing device, the system includes a memory storing a first digital representation of the test pattern, wherein the test pattern comprises (i) a first cell having a background of a first color and a pattern of a second color and (ii) a second cell having a background of the second color and a pattern of the first color. The system further includes a processor in communication with the memory, the printing device, and a scanner. The processor is programmed to print the test pattern onto the substrate using the printing device, receive from the scanner a second digital representation of the test pattern, and analyze at least a portion of the second digital representation of the test pattern to determine the print defects of the test pattern.

A method is disclosed for determining print defects of a test pattern formed on a substrate by a printing device, the method includes generating a first cell of the test pattern on the substrate, wherein the first cell has a background of a first color and a pattern of a second color, generating a second cell of the test pattern on the substrate, wherein the second cell has a background of the second color and a pattern of the first color, converting the first and second cells into a digital representation of the test pattern, and analyzing at least a portion of the digital representation of the first and second cells to determine the print defects of the test pattern.

The patterns of the first and second colors each have a plurality of dots. In addition, each of the plurality of the dots has a diameter of 0.1 inch. Further, each dot of the pattern of the first color has a unique x and y coordinate and each dot of the pattern of the second color has unique x and y coordinates that correspond to a dot of the pattern of the first color.

The analysis described above can include determining a first mean area of the pattern of the first color, determining a second mean area of the pattern of the second color and evaluating a difference between the first and second mean areas to calculate a gain index of the test pattern.

Alternatively, the analysis can include determining a first amount of migration between the pattern of the second color and background of the first color, determining a second amount of migration between the pattern of the first color and the background of the second color, and evaluating a difference between the first and second amounts of migration.

The method can further include generating a third cell of the test pattern on the substrate, wherein the third cell has a background of the first color and a pattern of the first color. In addition, generating a fourth cell of the test pattern on the substrate, wherein the fourth cell has a background of a second color and a pattern of a second color.

The analysis can then include selecting a color-band for the first and second colors, determining a first amount of the first color in the first and second cells from the selected color-band, determining a second amount of the second color in the first and second cells from the selected color-band, determining a third amount of the first color in the third and fourth cells from the selected color-band, determining a fourth amount of the second color in the third and fourth cells from the selected color-band, and determining a non-uniformity index based on a ratio of a difference between the first and second amounts to a difference between the third and fourth amounts.

A raggedness index can also be calculated by first determining a mean circularity of the dots of at least one of the patterns. The raggedness index is then determined by dividing the mean circularity by a predetermined value.

Another method is disclosed for assessing the print quality of a printing device. The method includes printing a test pattern onto a substrate using the printing device, wherein the test pattern comprises (i) a first cell having a background of a first color and a pattern of a second color and (ii) a second cell having a background of the second color and a pattern of the first color. The substrate having the test pattern printed thereon is scanned to generate a digital representation of the test pattern. At least a portion the digital representation of the test pattern is then analyzed to determine the print quality of the printing device.

Further features of the system and method for print analysis will become more readily apparent from the following detailed description taken in conjunction with the drawings.

BRIEF DESCRIPTION OF THE DRAWINGS

So that those of ordinary skill in the art to which the subject invention pertains will more readily understand how to make and use the system and method described herein, embodiments of the invention will be described in detail with reference to the drawings, wherein:

FIGS. 7(a) and 7(b) illustrate the selection of a threshold value for a color-pair; and FIGS. 8(a) and 8(b) illustrate the determination of a non-uniformity index (NUI).

These and other features of the system and method disclosed herein will become more readily apparent from the following detailed description of the embodiments taken in conjunction with the drawings.

DETAILED DESCRIPTION OF THE PREFERRED EMBODIMENTS

Reference is now made to the accompanying Figures for the purpose of describing, in detail, the preferred embodiments of the present invention. The Figures and accompanying detailed description are provided as examples of the invention and are not intended to limit the scope of the claims appended hereto.

The present invention provides a novel and unique method and system for analyzing the printing properties of a substrate. The system and method analyzes a new test pattern including two or more cells having "inverse color-pairs" printed thereon to facilitate the determination of a wide variety of print defects. As used herein, an "inverse color-pair" refers to a pair of cells, wherein a first cell has a pattern of a first color on a background of a second color and a second cell has a pattern of the second color on a background of the first color. Unlike the prior art, the analysis of inverse color-pairs permits the inventive system and method to determine print defects with regard to multi-dimensional growth of the test pattern printed on a substrate.

Those skilled in the art will recognize that the present invention can also be used for analyzing the print quality of printing device 30 or other types of printing machines, for example, those used in offset-lithography, flexography, and gravure. Many of the variables encountered during such an analysis can be reduced by using a controlled substrate, for example, high quality paper which is maintained in a controlled environment.

Figure 1:
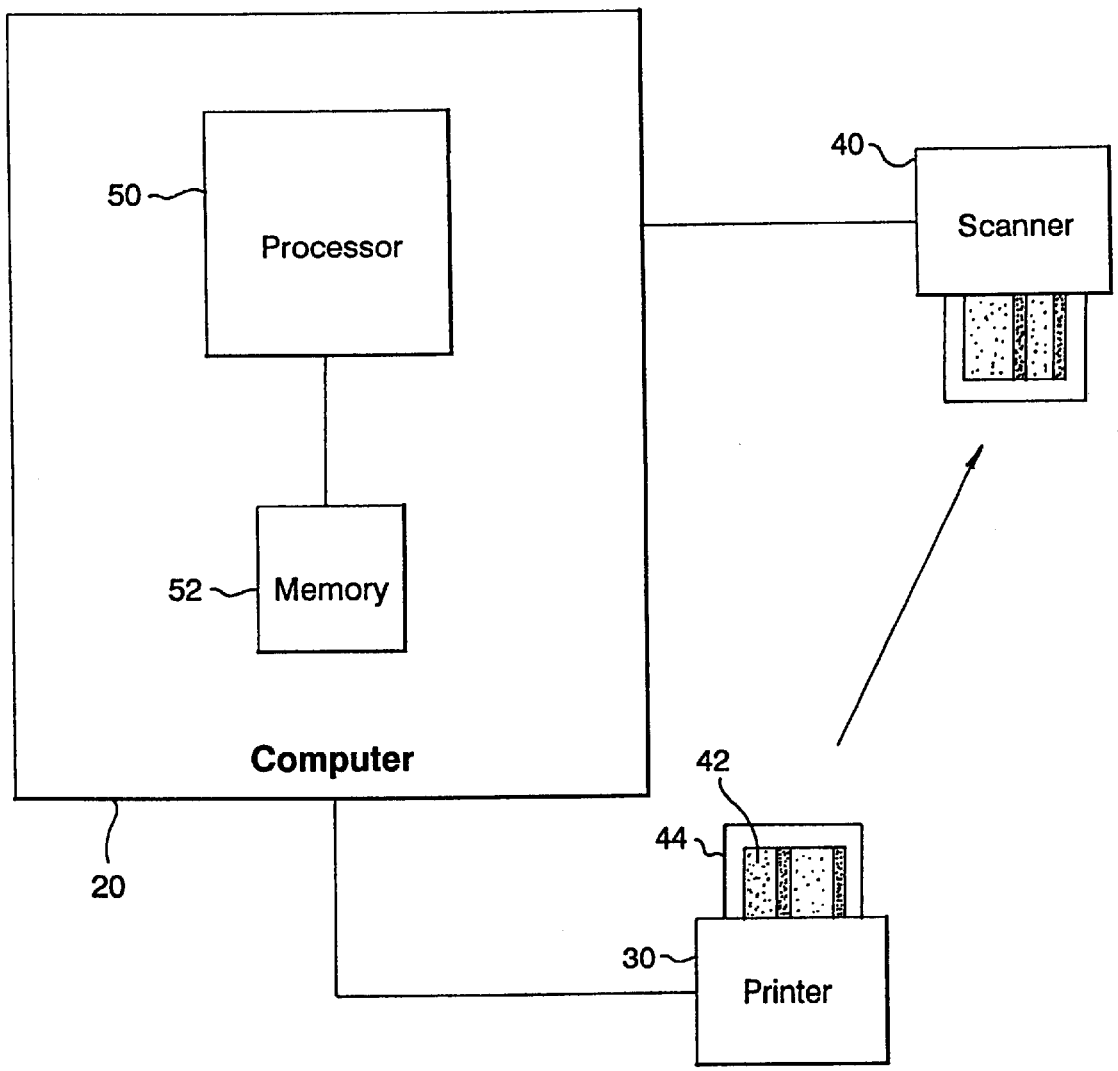
FIG. 1 is a schematic representation of a system for print analysis.

Referring now to FIG. 1 there is illustrated a print analysis system 10 configured in accordance with an embodiment of the present invention for analyzing the printing properties of a substrate. The system 10 includes a personal computer 20 in communication with a printer 30 and a scanner 40. Printer 30 is capable of printing the test pattern 42 stored on the personal computer 20 onto a substrate 44. Scanner 40 is capable of scanning and transmitting a digital representation of the substrate 44 with the test pattern 42 printed thereon to the personal computer 20 for analysis. The printing properties of the substrate are determined by analyzing the type and degree of print defects that exist in the digital representation of the test pattern.

In one embodiment, personal computer 20 includes a 266 MHz MMX Pentium® processor 50 (Intel Corp., Santa Clara, Calif.) which is in communication with memory 52. In one embodiment, memory 52 includes 96 Mbytes of random access memory (RAM), 8 Mbytes of RAM for a video monitor (not shown), and one (1) Gbyte of hard disk storage. These elements are configured and communicate in a well-known manner.

Printer 30 may be any of the various printers available in the market. In one embodiment, printer 30 is used to print test pattern 42, which is scanned by scanner 40 and analyzed by personal computer 20. In another embodiment, other printing devices may be used to print test pattern 42, and printer 30 may be used for printing reports relating to the analysis of test pattern 42.

Scanner 40 may be any available scanner, for example a high resolution machine such as a DuoScan® 1000 dpi scanner (Bayer Corporation, AGFA Division, Ridgefield Park, N.J.). The DuoScan® scanner has a two-bulb scanning head and sensors for receiving both reflected and transmitted light. Alternatively, a lower resolution machine can be used, such as an HP 6200C or HP 6250C PrecisionScan Pro® (Hewlett-Packard Company, Palo Alto, Calif.). The above machines have the ability to receive instructions from well-known TWAIN-compliant software programs (drivers) stored in the memory 52 of personal computer 20.

Figure 2:
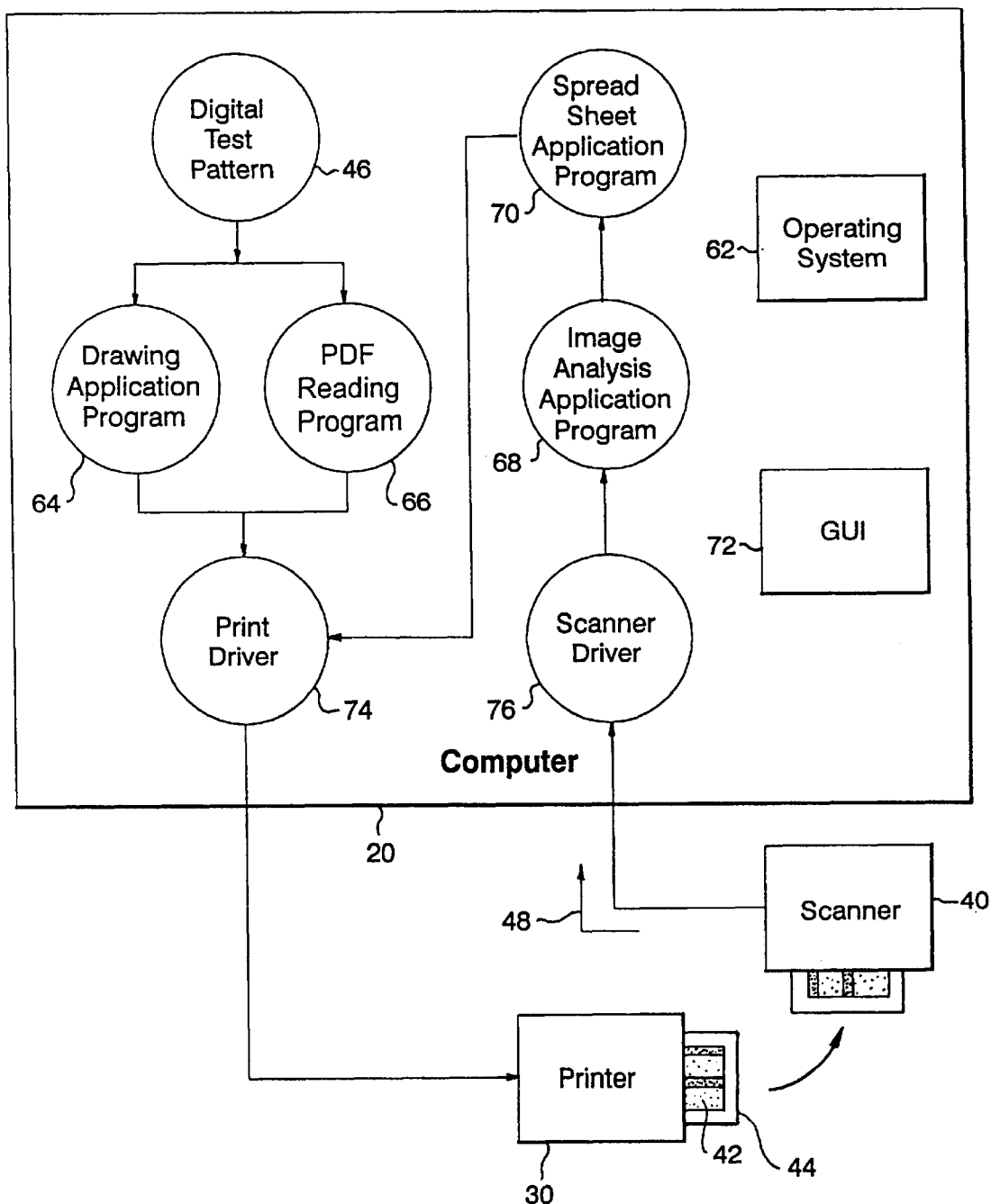
FIG. 2 is a flow chart illustrating the operation of a system for print analysis.

Referring to FIG. 2, personal computer 20 runs on a Windows NT (Microsoft Corp., Redmond, Wash.) operating system 62 and includes the following application programs: a drawing application program 64; a portable document format (PDF) reading program 66; an image analysis application program 68; and a spreadsheet application program 70. A graphical user interface (GUI) 72 enables a user to readily control the application programs. In one embodiment, the GUI 72 is written in Microsoft's Visual Basic. Appropriate printer and scanner rivers 74 and 76 enable the printing and scanning capabilities described herein.

In general operation, personal computer 20 stores a digital version 46 (digital test pattern) of test pattern 42 in memory 52. A drawing application program 64 such as Canvas™ (Deneba Systems Inc., Miami, Fla.) may be used to generate the digital test pattern 46 and may also enable a user to alter the configuration of the digital test pattern 46 to facilitate the particular type of printing device that is to be used or substrate to be tested. Drawing application program 64 reads and transmits the digital test pattern 46 to the printer 30 via the printer driver 74.

Alternatively, digital test pattern 46 may be stored in memory 52 in the well-known PDF format. In this case, a PDF reading program 66 such as Acrobat™ Reader (Adobe Systems Inc., San Jose, Calif.) may be used to read and transmit the digital test pattern 46 to the printer 30 via the printer driver 74.

After the drawing application program 64 (or the PDF reading program 66) transmits the digital test pattern 46 to the printer 30, the digital test pattern 46 is printed onto a substrate 44, for example, a sheet of paper. Those skilled in the art will recognize that the digitized test pattern 46 can be printed on a substrate 44 made of material other than paper. For example, substrates can be made of plastics such as mylar or velum to facilitate analyzing the print quality of a printing device.

After the digital test pattern 46 has been printed by the printer 30 onto the substrate 44, the printed test pattern 42 and substrate 44 are scanned by scanner 40. The printed test pattern 42 and substrate 44 are scanned as re-digitized test pattern 48 using a TWAIN-compatible scanner driver 76. After scanning, the re-digitized test pattern 48 is stored in memory 52 at which time it is available for analysis by the image analysis application program 68. In one embodiment, an image analysis application program 68 such as Optim™ (Media Cybernetics, L.P., Silver Spring, Md.) is used to analyze print defects of the re-digitized test pattern 48. A GUI 72 may be used to activate the image analysis application program 68.

The image analysis application program 68 includes a number of standard software functions for manipulating and analyzing the re-digitized test pattern 48. For example, such standard software functions allow a user to assign gray-scale values to pixels, apply threshold values to distinguish pixels, count pixels, and perform arithmetic operations. The image analysis application program 68 also includes a number of custom software functions that are programmed using a programming language such as Media Cybernetics' Analytical Language for Images (ALI), which is provided with Optim™. The custom software functions include a number of equations that are used to manipulate re-digitized test pattern 48 in order to determine the defects thereof. The custom software functions are described in detail below.

The results of the image analysis application program 68 are transmitted to a spreadsheet application program 70, such as Microsoft's Excel™. The results are formatted on a spreadsheet and sent to the printer 30 via the printer driver 74. The user is then able to use the results, for example, by comparing them to test results obtained earlier for printer 30.

The results can also be stored in memory 52 for later use, such as for evaluating the printing properties of particular type of substrate over an extended period of time. The results can be accumulated to perform statistical analysis or the like.

As noted above, the print quality of printing device 30 can be analyzed utilizing the above described print analysis system. The print quality of print devices other than printer 30 may also be evaluated using the print analysis system 10. For example, test pattern 42 can be printed onto a substrate by a printing machine of the type used in offset lithography (not shown). Thereafter, the substrate having the test pattern 42 printed thereon can be scanned into scanner 40 and analyzed by personal computer 20 in a manner similar to that described above.

Figure 3:
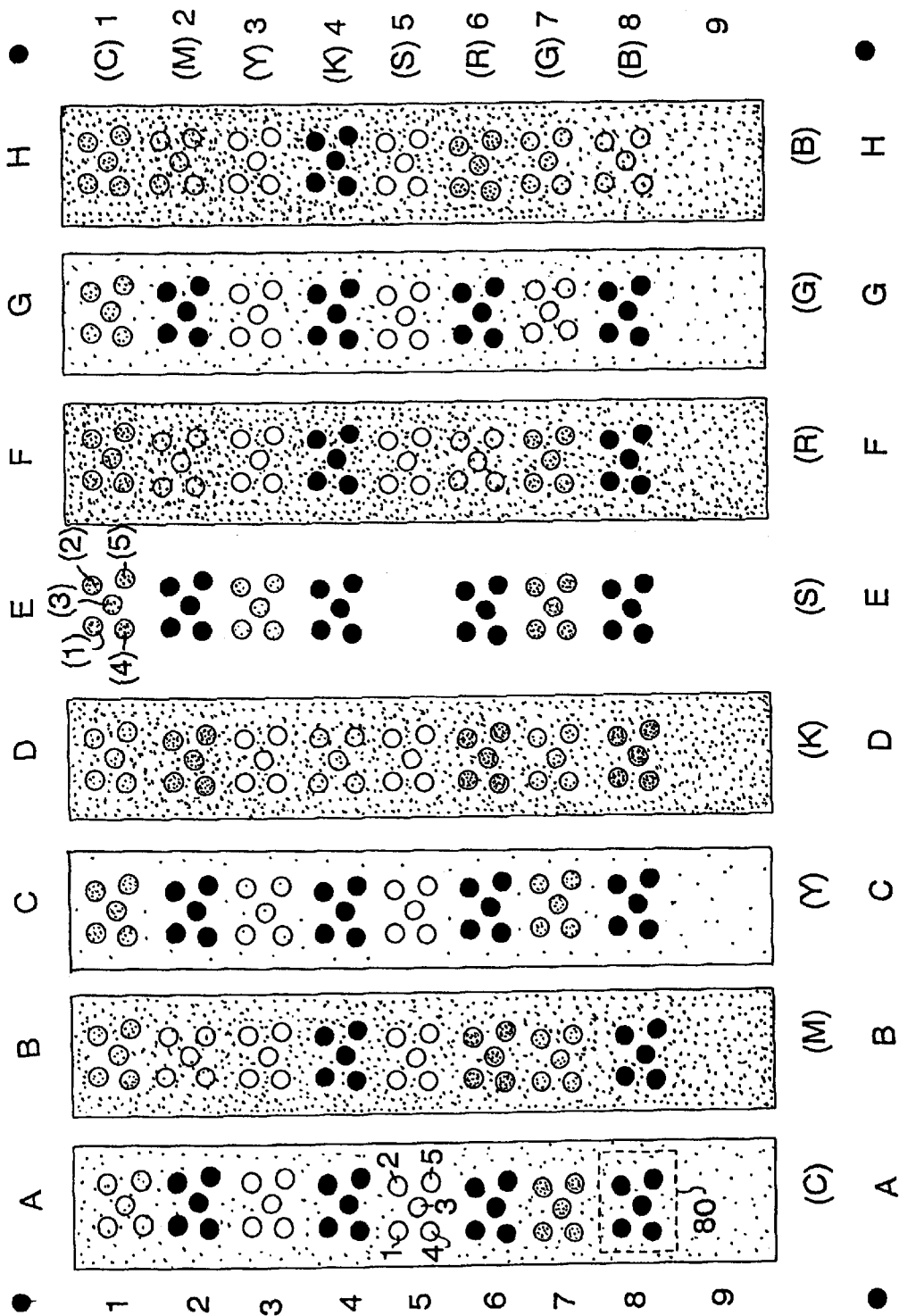
FIG. 3 is a test pattern used in analyzing printing defects.

Referring now to FIG. 3 there is illustrated an embodiment of test pattern 42. The exemplary test pattern 42 includes eight (8) parallel bars A–H. The first four (4) bars A–D are colored in the four primary colors of cyan (C), magenta (M), yellow (Y), and black (K), respectively. The fifth bar E is an unprinted area of the substrate, which therefore assumes the color of the substrate, e.g., the color of paper on which test pattern 42 may be printed. The remaining three (3) bars F–H are colored in the secondary colors of red (R), green (G), and blue (B), respectively.

Each bar A–H has nine (9) areas which are referred to herein as "cells". The cells are positioned in rows 1–9 of test pattern 42. Although the cells in each bar A–H of the described embodiment are rectangular in shape, they may have other shapes without departing from the scope of the invention.

Throughout this detailed description, each cell is referred to by an alpha-numeric character—based on its column and row—which identifies the cell. For example, the cells in the upper-left and the lower-right corners of test pattern 42 are referred to as cells A1 and H9, respectively.

In the described embodiments, each of cells A1-H8 is shown to contain five (5) dots. Each-group of the five (5) dots in a cell is referred to herein as a "dot group". The dots within each dot group are the same color. In addition, the dot groups within each row (1–8) of cells are the same color.

More specifically, the dot groups in row 1 (cells A1-H1) are each cyan (C). The dot groups in row 2 (cells A2-H2) are each magenta (M). The dot groups in row 3 (cells A3-H3) are each yellow (Y). The dot groups in row 4 (cells A4-H4) are each black (K). The dot groups in row 5 (cells A5-H5) are each the color of the substrate on which the test pattern is printed. The dot groups in row 6 (cells A6-H6) are each red (R). The dot groups in row 7 (cells A7-H7) are each green (G). Finally, the dot groups in row 8 (cells A8-H8) are each blue (B).

The dot groups of the cells along the diagonal (i.e., A1, B2, C3, D4, E5, F6, G7, and H8) have dots that are the same color as the bars on which they are printed. For example, cell A1 has a cyan dot group printed on a cyan bar. Row 9 (cells A9-H9) does not have any dot groups printed thereon.

The problem of aliasing and moire patterns is well-known in the printer-related arts. Aliasing is the jagged appearance of diagonal lines on printouts and on video monitors and a moire pattern is a pattern created when a first pattern is superimposed on second pattern which is offset from the first. The result is alternatively referred to as the moire effect. Either or both of these phenomena occur when a digital image of one resolution and/or registration is mapped into a digital image space of a different resolution and/or registration. In the case of a digitally printed image being re-digitized with a scanner, it is virtually impossible to perfectly align the rectilinear grid of the printed image with the rectilinear grid of the scanner. Some x and y offset, as well as angular skewing of the two grids, is common.

In view of the problems associated with aliasing and moire patterns, two characteristics of the dot groups have been controlled. That is, the diameters of the dots have been fixed at one-tenth (0.1) of an inch and the dot positions within each dot group have been randomized.

Fixing the diameters of the dots at one-tenth (0.1) of an inch allows the printer driver 74 to render a whole number of pixels in the x and y diameter axes of each dot. This technique attempts to minimize aliasing effects that are normally introduced when a dot diameter is used that is not a whole number of the pixels.

For example, on a 300 dots-per-inch (dpi) printer, the one-tenth (0.1) inch diameter dots are exactly 30 pixels tall and 30 pixels wide. On a 1440 dpi printer, the one-tenth (0.1) inch diameter dots are exactly 144 pixels tall and 144 pixels wide. It is thus seen that a whole number of pixels will print within the diameter of a one-tenth (0.1) inch dot in the x and y direction. Of course, dots having other diameters—whether or not they equal a whole number of pixels—can be used. In the latter case, the advantages of using a whole number of pixels will not be realized. In an alternate embodiment dot group, the dots in each dot group have different diameters to further reduce the creation of moiré patterns.

The dots have been randomized within each dot group by offsetting each of the five dots within a dot group so that no two dots share the same x or y coordinates. This technique attempts to further reduce the creation of moire patterns by reducing repeating patterns that otherwise would be introduced during scanning.

In the described embodiments, the dot groups are not randomized in relation to each other, i.e., the dot groups within the test pattern are equally spaced from each other. However, it is foreseeable that randomization of the dot groups can be employed to further reduce the effects of repeating patterns.

Five (5) dots per dot group have been chosen in order to reduce memory and processing requirements of personal computer 20, while at the same time allowing for acceptable within-group analysis. Although more dots per dot group would be beneficial, this would increase the memory and computation requirements for the personal computer 20. As processor speeds and memory capacities increase and become more economical, the number of dots per dot group can be increased to allow for a greater number of samples for analysis.

It is foreseeable that an embodiment of the present invention can include patterns or groups of patterns other than the dot groups described above. The patterns or groups of patterns would facilitate a determination of the printing characteristics of a printing device in a manner similar to that described herein for the dot groups.

Still referring to FIG. 3, it is seen that test pattern 42 includes twenty-eight (28) inverse-color-pairs (ICPs). An ICP refers to a pair of cells, wherein a first cell has a dot group of a first color printed on a background of a second color and a second cell has a dot group of the second color printed on a background of the first color. A first cell of a particular ICP is referred to herein as an "inverse-color cell" of a second cell of the ICP, and visa versa.

The ICPs in test pattern 42 may be divided into four groups. The custom software functions (described below) use the four groups to analyze print defects of test pattern 42. The groups and their constituent ICPs are tabulated below, wherein "S" indicates the color of the substrate 44.

| Group | ICP (Cell #1 & #2) | Colors of Cell #1 | Colors of Cell #2 | Group | ICP (Cell #1 & #2) | Colors of Cell #1 | Colors of Cell #2 |
|---|---|---|---|---|---|---|---|
| First | E4 and D5 | K on S | S on K | Fourth | B1 and A2 | C on M | M on C |
|  |  |  |  |  | C1 and A3 | C on Y | Y on C |
| Second | E1 and A5 | C on S | S on C |  | F1 and A6 | C on R | R on C |
|  | E2 and B5 | M on S | S on M |  | G1 and A7 | C on G | G on C |
|  | E3 and C5 | Y on S | S on Y |  | H1 and A8 | C on B | B on C |
|  | E6 and F5 | R on S | S on R |  | C2 and B3 | M on Y | Y on M |
|  | E7 and G5 | G on S | S on G |  | F2 and B6 | M on R | R on M |
|  | E8 and H5 | B on S | S on B |  | G2 and B7 | M on G | G on M |
|  |  |  |  |  | H2 and B8 | M on B | B on M |
| Third | D1 and A4 | C on K | K on C |  | F3 and C6 | Y on R | R on Y |
|  | D2 and B4 | M on K | K on M |  | G3 and C7 | Y on G | G on Y |
|  | D3 and C4 | Y on K | K on Y |  | H3 and C8 | Y on B | B on Y |
|  | D6 and F4 | R on K | K on R |  | G6 and F7 | R on G | G on R |
|  | D7 and G4 | G on K | K on G |  | H6 and F8 | R on B | B on R |
|  | D8 and H4 | B on K | K on B |  | H7 and G8 | G on B | B on G |

Of course, cells A9-H9 and the cells on the diagonal do not have respective ICPs.

Although this embodiment of the test pattern 42 includes twenty-eight (28) ICPs, it is foreseeable that a minimal number of ICPs can be advantageously employed to determine the printing properties of a substrate. For example, it is foreseeable that one or two ICPs can be printed along the edge of a printed sheet during printing on an off-set lithography printing machine. Analysis of the ICPs would almost immediately provide an operator of the printing machine with valuable information regarding the stability of the printing process. In addition, the results obtained therefrom may be electronically transmitted back to the printing machine to automatically adjust the variables of the printing process.

As noted above, prior art print quality analysis systems evaluate test patterns in a one-dimensional manner. That is, they typically evaluate only the overall growth of a test pattern printed on a substrate. In contrast, an embodiment of the present invention evaluates multi-dimensional growth of a test pattern. This multi-dimensional method of analysis is an improved criterion for testing the printing properties of a substrate because it provides a more complete measure of the printability of the printer.

For example, a certain amount of outward growth of a character may be acceptable while the same amount of outward growth in combination with a reduction in a characters openings (e.g., inward growth) may be unacceptable. As a more specific example, the outward growth of the letter 'B' may be acceptable because the letter would appear only slightly larger (e.g., 'B'). On the other hand, the outward and inward growth of the letter 'B' will cause the letter to be slightly larger and, in addition, cause a reduction in the size of the letters openings. In the latter case, the letter would be perceptually emboldened (e.g., 'B') and thereby unacceptable.

The one-dimensional nature of existing print quality analysis systems extends to the evaluation of two contiguously printed inks also. For example, the prior art systems do not concurrently consider the multi-directional interaction of a printed background of a first color with a printed pattern of a second color. As will be described below, an embodiment of the present invention concurrently considers the multi-directional interaction of contiguously printed inks.

Figure 4:
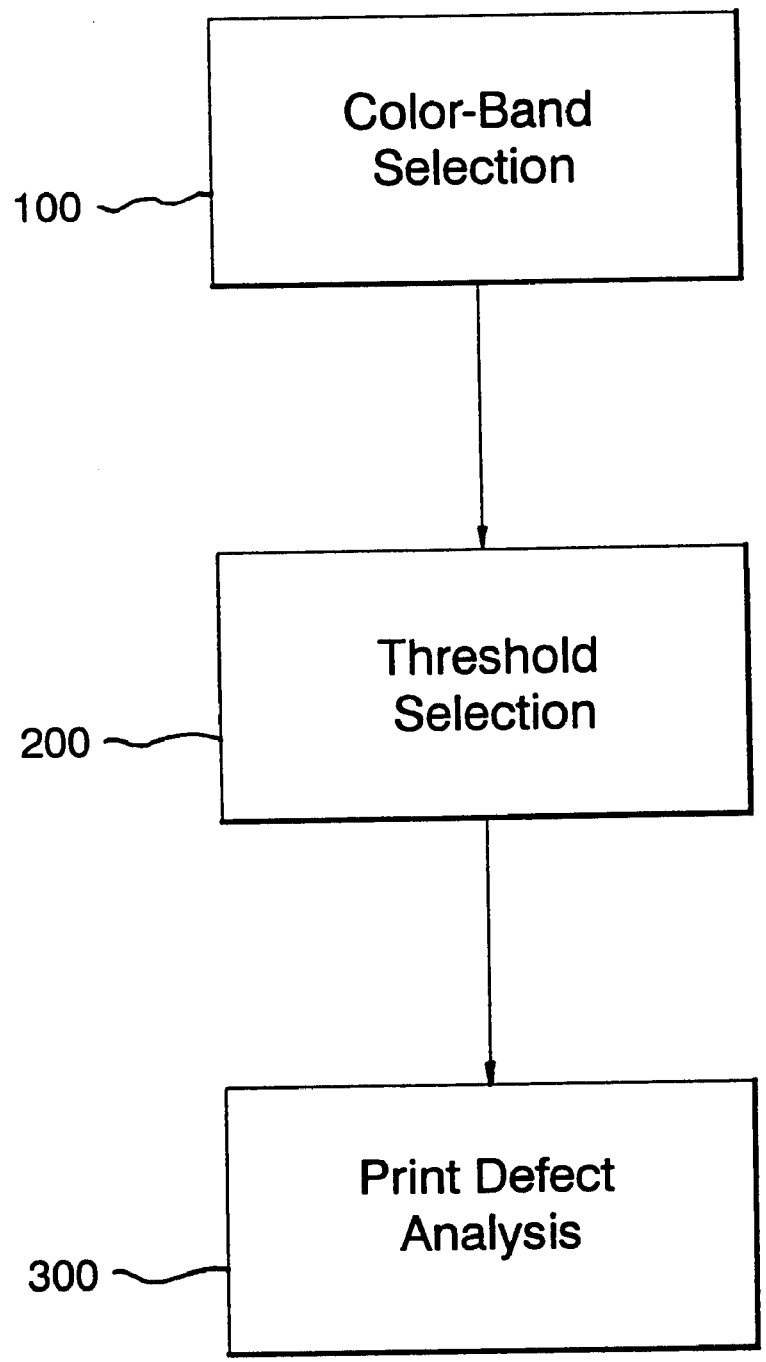
FIG. 4 is a flow chart illustrating the steps taken to determine print defects.

Referring to FIG. 4, an embodiment of a procedure for analyzing print defects on re-digitized test pattern 48 is illustrated. This procedure is executed according to the software instructions contained in the custom software functions of image analysis application program 68.

As will be explained in more detail below, one aspect of the procedure compares each color in re-digitized test pattern 48 with all other colors therein. Because there are eight (8) different colors in re-digitized test pattern 48 (C, M, Y, K, R, G, B, and the color of the substrate), there are a total of twenty-eight (28) possible color combinations. Therefore, twenty-eight (28) comparisons are made between the colors in re-digitized test pattern 48. For example, cyan (C) is compared against M, Y, K, R, G, B, and the color of the substrate; magenta (M) is compared against C, Y, K, R, G, B, and the color of the substrate; etc.

Each combination of two colors is referred to as a "color-pair". The color-pairs are compared in order to enable the image analysis application program 68 to more accurately differentiate between the colors in each color-pair. This, in turn, makes it possible for the custom software functions to provide more accurate results.

It is well known in the art that each color on a substrate is converted into its equivalent R, G, and B colors when scanned into a computer by a scanner. In the detailed description that follows, the representation of a color in its equivalent R, G, and B colors is collectively referred to as the "RGB equivalent" of that color. Also, each of the three secondary colors (R, G, and B) of an RGB equivalent is referred to as a "color-band". In addition, each color-band of a first color of a color-pair corresponds to a color-band of a second color of the color-pair. That is, the red (R) color-bands of the first and second colors of a color-pair correspond, the green (G) color-bands of the first and second colors of a color-pair correspond, and the blue (B) color-bands of the first and second colors of a color-pair correspond. The color-bands in the first and second color of a color-pair that correspond are referred to as "corresponding color-bands".

Still referring to FIG. 4, at step 100, for each color-pair, one of the three corresponding color-bands is selected to represent the color-pair in the analyses of re-digitized test pattern 48. The color-band selected is that which best distinguishes the differences between the two colors. At step 200, each selected color-band is evaluated to determine a threshold value for each color-pair. At step 300, the selected color-bands and the threshold values determined at steps 100 and 200, respectively, are used to facilitate analysis of re-digitized test pattern 48 for print defects.

Figure 5:
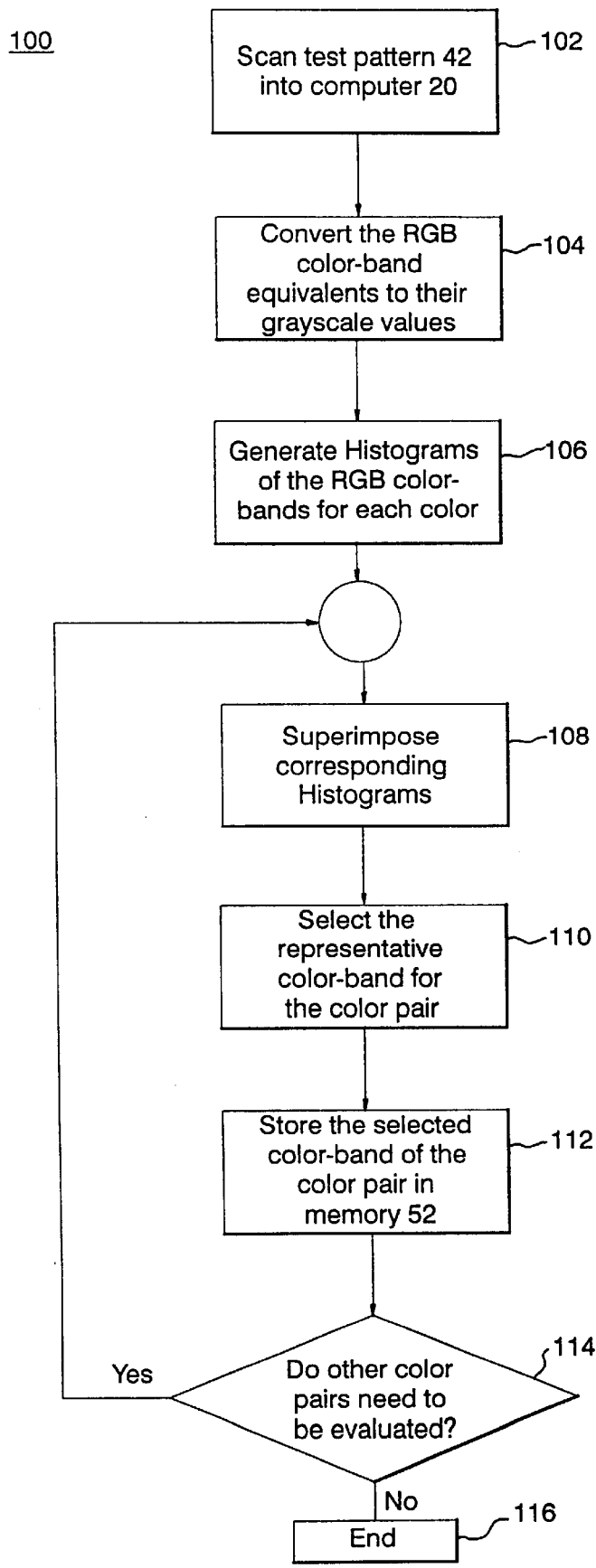
FIG. 5 is a flow chart illustrating the steps taken to select a color-band for a color-pair.
Figure 6:
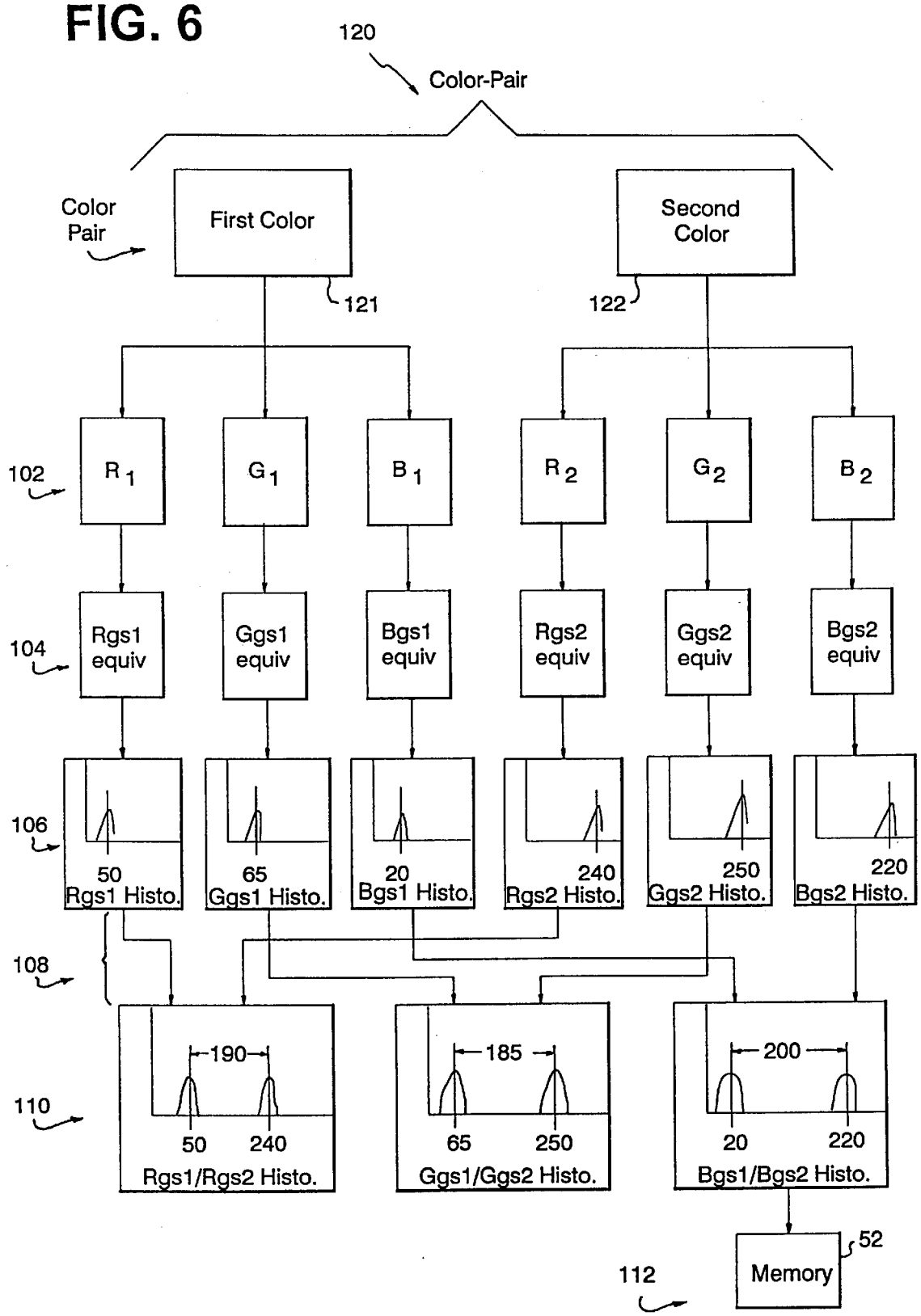
FIG. 6 illustrates the process of selecting a color-band for a color-pair.

FIG. 5 is a flow chart illustrating an embodiment of step 100 for selecting a color-band for a color-pair. In the description of the flow chart illustrated in FIG. 5, reference is made to FIG. 6, wherein there is illustrated an example of the selection of a color-band for a color-pair 120 consisting of a first color 121 and a second color 122.

At step 102, substrate 44 having the test pattern 42 printed thereon is scanned into scanner 40 as re-digitized test pattern 48. During the scanning process, each color of the test pattern is converted and stored in memory 52 as its RGB equivalent. For example, the first color 121 and second color 122 of color-pair 120 (FIG. 6) are converted to $R_1$, $G_1$, and $B_1$ and $R_2$, $G_2$, and $B_2$, respectively.

At stop 104, each RGB equivalent is converted to its equivalent gray-scale value. For example, $R_1$, $G_1$, and $B_1$ of first color 121 (FIG. 6) are converted to their equivalent gray-scale values $R_{gs1}$, $G_{gs1}$, and $B_{gs1}$, respectively. Similarly, $R_2$, $G_2$, and $B_2$ of second color 122 are converted to their equivalent gray-scale values $R_{gs2}$, $G_{gs2}$, and $B_{gs2}$, respectively.

It is noted here that scanner 40 scans the test pattern 42 into the computer 20 as pixels. Therefore, when test pattern 42 is scanned into computer 20 as described above at step 102, it is scanned in as RGB equivalents of the pixels which are generated by scanner 40. In addition, when each RGB equivalent is converted to its equivalent gray-scale value as described above at step 102, it is the RGB equivalent of each pixel that is converted to equivalent gray-scale values.

It is also noted that a region of interest (ROI) is generated about the five (5) colored dots within each cell at step 104 to ensure that color-band selection is based on the five (5) colored dots and the colored background of each cell. It is well known in the art that selecting ROIs avoids errors which may be introduced by including data scanned in from outside the area of each cell. FIG. 3 illustrates an ROI 80 for cell A8. ROIs are also used for threshold selection (200) and print defect analysis (300), described below.

At step 106, the pixels making up each color, each having a gray-scale value assigned thereto, are used to generate histograms. Thereafter, the mean gray-scale value of each histogram is determined. For example, all of the pixels of $R_{gs1}$, $G_{gs1}$, and $B_{gs1}$ (FIG. 6) having the same gray-scale values are counted and their frequency (total number of pixels having the same gray-scale value) graphed on a histogram, wherein the x-axis represents the gray-scale level and the y-axis represents the frequency with which they occur. In this example, the mean gray-scale values for $R_{gs1}$, $G_{gs1}$, and $B_{gs1}$ are calculated to be fifty (50), sixty-five (65), and twenty (20), respectively. The mean gray-scale values for $R_{gs2}$, $G_{gs2}$, and $B_{gs2}$ are calculated to be 240, 250, and 220, respectively.

At step 108, corresponding histograms are superimposed to form compound histograms. For example, the $R_{gs1}$ histogram (FIG. 6) is superimposed onto the $R_{gs2}$ histogram, the $G_{gs1}$ histogram is superimposed onto the $G_{gs2}$ histogram, and the $B_{gs1}$ histogram is superimposed onto the $B_{gs2}$ histogram. Each of the compound histograms are bi-nodal. That is, each compound histogram exhibits two distinct humps or bell-shaped curves.

At step 110, the mean gray-scale values in each compound histogram are subtracted to determine the largest difference. That is, the mean gray-scale values for the compound histogram of the red (R) color-band are subtracted, the mean gray-scale values for the compound histogram of the green (G) color-band are subtracted, and the mean gray-scale values for the compound histograms of the blue (B) color-band are subtracted. The color-band having the largest difference between mean gray-scale values is selected as the representative color-band for that particular color-pair. Here, the blue (B) color-band having a difference of 200 would be selected because it is greater than the differences in the red (R) color-band (190) and the green (G) color-band (185).

Step 112 of the program includes storing the superimposed histograms of the selected color-band in memory 52. For example, the blue (B) color-band $B_{gs1}/B_{gs2}$ (FIG. 6) is stored in memory 52 and is used in all threshold value determinations (step 200) and in print defect analysis (step 300) involving, for example, ICPs.

With continued reference to FIG. 5, at step 114, the image analysis application program 68 determines whether additional color-pairs need to be evaluated. If other color-pairs are to be evaluated, then the program returns to step 108. The program terminates at step 116 after all of the color-pairs have been evaluated.

Those skilled in the art will recognize that using select color-bands of a color-pair, as opposed to using all color-bands of a color-pair, substantially improves the ability to differentiate between the colors of the color-pair. This improved ability further enhances threshold value determinations and print defect analyses. An additional advantage is the reduced number of calculations that the processor 50 must carry out, resulting in substantially increased processing speed and efficiency.

After the color-band of a color-pair has been selected at step 100, a threshold value for the color-pair is selected. In general, a threshold value is a number which is used to divide a set of values into two groups. For the particular application herein, i.e., the threshold value of a color-pair, the threshold value is the gray-scale value which distinguishes the two colors of a color-pair. For example, if a threshold value of 150 is applied to a first pixel having a gray-scale value of 100 and a second pixel having a gray-scale value of 200, the first pixel would fall into a first group and the second pixel would fall into a second group.

Threshold values are applied in an analogous fashion to the color-bands selected to represent a color-pair. For example, a threshold value can be applied to the blue (B) color-band $B_{gs1}/B_{gs2}$ that was determined at step 110 of FIG. 6. If the threshold value is appropriately selected, all of the pixels of first color will be to the left of the threshold value and all of the pixels of the second color will be to the right of the threshold value.

In prior art image analysis systems, a single threshold value is established for all color-pairs. Because a common thresholding value does not account for the distinctions between selected color-bands of different color-pairs, errors will exist for those color-pairs whose histograms stray too far toward the left or the right.

For example, in FIGS. 7(a)(i)–(iii), a single threshold value of 125 is selected for three color-bands, each color-band representing a color-pair. The color-band (a)(i) has a gray-scale value for a first color of 200 and for a second color of 50, the color-band (a)(ii) has a gray-scale value for a first color of 120 and for a second color of 230, and the color-band (a)(iii) has a gray-scale value for a first color of 50 and for a second color of 180.

Although the single threshold value of 125 is satisfactory for the color-band (a)(i), i.e., all of the pixels of the first color fall to the left of the threshold value and all of the pixels of the second color fall to the right of the threshold value, it is unsatisfactory for the color-bands (a)(ii) and (a)(iii).

As illustrated in FIGS. 7(a)(ii) and (a)(iii), errors will be introduced into any calculation based on the single threshold value of 125 since pixels that should be considered as part of one group will be counted as part of another group. For example, a number of the pixels in color-band (a)(ii) that should be considered as part of the group to the left of the threshold value will be considered as part of the group to the right of the threshold value.

FIGS. 7(b)(i)–(iii) illustrates the affect of determining a threshold value for each color-pair by a method conforming to an embodiment of the present invention. In general, the "variable thresholding" method includes taking the difference between each mean gray-scale value of a selected color-pair. Then, the difference is divided by two (2) and added to the lower gray-scale value. Thereafter, any pixel to the left of the threshold value is considered as part of the first group, i.e., the first color group of pixels, and any pixel to the right of the threshold value is considered as part of the second group, i.e., the second color group of pixels. Each color-pair is evaluated to determine its unique threshold value. The threshold value for each color-pair is stored in memory 52.

For example, in FIG. 7, the color-band (b)(i) has a gray-scale value identical to that of the color-band (a)(i), i.e., 200 for the first color and 50 for the second color. Variable thresholding produces a threshold value of 125 ((200–50)/2+50). Also, the color-band (b)(ii) has a gray-scale value identical to that of the color-band (a)(ii), i.e., 230 for the first color and 120 for the second color. Variable thresholding for this color-pair produces a threshold value of 175 ((230–120)/2+120). Finally, the color-band (b)(iii) has a gray-scale value identical to that of the color-band (a)(iii), i.e., 180 for the first color and 50 for the second color. Variable thresholding produces a threshold value of 115 ((180–50)/2+50). From the examples above, it is clear that variable thresholding results in reduced-error pixel grouping between color-pairs.

As described above, an embodiment of the present invention includes step 100 wherein the color-band that represents the largest difference between each color-pair is selected and step 200 wherein a threshold value is determined for each color-pair. Thereafter, one or more custom software functions may be executed at step 300 to determine printing defects in the re-digitized test pattern 48. The custom software functions, referred to generally as "print defect indices", may be executed individually through the GUI 72 or automatically in a predetermined sequence. The results obtained therefrom are transmitted to spreadsheet application program 70. The custom software functions of step 300 are described in detail below.

In one embodiment of the invention, the print defect indices include general equations for gain index (GI), raggedness index (RI), and non-uniformity index (NUI). The print defect indices enable a user to readily determine deviations in printing properties with respect to theoretically perfect print. A custom software function for determining a weighted sum (WS) is also included to provide a single number representing the overall printing properties of a substrate.

"Theoretically perfect print" is where ink pixels dry perfectly on the surface of the substrate with no migration of the ink in the paper, i.e., no wicking. If the test pattern is printed "perfectly", then all of the print defect indices will be equal to zero percent (0%) and the weighted sum would be equal to one-hundred percent (100%) since there would be no deviation from perfect print. Of course, it is impossible to obtain perfect print; however, by utilizing the print defect indices a user can determine a standard, or benchmark, by which to gauge the substrate being analyzed. Thereafter, periodic print testing (sampling) is conducted to ensure the substrate type being tested remains consistent.

The gain index (GI) enables a user to determine the overall change of a character which is printed onto a substrate. In particular, GI looks at the change of a character's area through wicking of printed ink into the substrate. In addition, GI looks at the change of a character's area through bleed between inks that are printed contiguously. The more that print on a substrate deviates from perfect print, the larger the GI percentage will be.

The GI is determined by taking one-half of the absolute value of the difference between the mean areas of the dots in each cell of an ICP. The result is divided by the dot area of a perfect dot, e.g., the area of a dot having one-tenth (0.1) of an inch diameter. The ratio is multiplied by one-hundred (100) and the gain caused by the printer driver 74 ($G_{pd}$) is subtracted.

In one embodiment of the present invention, the areas of the dots are determined using standard software functions in the image analysis application program 68. The area-calculation function initially evaluates the pixels in the cells of interest and determines which pixels are of a first color group and which pixels are of a second color group. This procedure takes advantage of the color-band and threshold selection processes described above at steps 100 and 200, respectively. The number of pixels representing the dots in the cells of interest are then multiplied by the area that each pixel encompasses. For example, if a dot that is printed with a 600 dpi printer is determined to have 2900 pixels, the area is calculated by multiplying 2900 pixels×2.78μ in$^2$ (the approximate area of a 600 dpi pixel). The area of the 2900 pixel dot is equal to 8.05×10$^{-3}$ in$^2$.

The print-driver gain ($G_{pd}$) is subtracted from the GI because it is recognized that printer drivers have an impact on the size, shape, ink density, and color composition of printed areas. For example, certain printer drivers compensate for characteristics of a printer engine by reducing the amount of ink that is dispersed onto the substrate.

$G_{pd}$ is determined empirically through testing and thereafter input into the appropriate custom software function(s). For a discussion concerning the effects of printer drivers on printer output see *A Method For Measuring Ink-Jet Wicking Using A Document Scanner And A Personal Computer*, R. Rosenberger, TAPPI Journal, Vol. 81: No. 3, pp71–81 (March 1998), incorporated by reference herein.

The equation for the gain index (GI) has the general form:

$$GI = 100 * \left[ \frac{\left| \left( \frac{\sum A_d}{n} \right) - \left( \frac{\sum A'_d}{n} \right) \right|}{2 * \pi r_p^2} \right] - G_{pd}$$

wherein:

$A_d$=area of one of the dots in a cell;

$A'_d$=area of one of the dots in the inverse color cell;

n=total number of dots;

$r_p$=reference radius of a perfect dot (e.g., 0.05 inch); and $G_{pd}$=gain due to the printer driver.

The GI can be determined between an ICP including a cell having printed dots on an unprinted background and a cell having unprinted dots on a printed background. Examples of ICPs having this characteristic are in the first and second ICP groups. GIs evaluating these ICPs are referred to herein as monochrome gain indices (MGIs).

Alternatively, the gain index can be determined between an ICP including a cell having printed dots of a first color on a printed background of a second color and a cell having printed dots of the second color on a printed background of the first color. Examples of ICPs having this characteristic are the ICPs in the third and fourth ICP groups. GIs evaluating these ICPs are referred to herein as duochrome gain indices (DGIs).

Note that the term "chrome" as used herein (with monochrome and duochrome) refers to those colors generated by the application of ink, i.e., C, M, Y, K, R, G, and B. The term chrome is not intended to refer to the color of a substrate. Therefore, "monochrome" identifies a single printed color on a substrate and "duochrome" identifies two printed colors on a substrate.

Referring to FIG. 3, an example of the application of the general equation for monochrome gain index (MGI) is given below for the ICP E1 and A5 which is from the second ICP group. E1 has cyan dots on an unprinted substrate and A5 has substrate-colored dots on a cyan background. In FIG. 3, the five (5) dots of E1 are labeled 1–5 and the five (5) substrate-colored dots in A5 are labeled 1–5. The area for dot one (1) in cell E1 is identified below as $A_{E1.1}$, the area for dot two (2) of cell E1 is identified below as $A_{E1.2}$, etc. The area for dot one (1) in cell A5 is identified below as $A_{A5.1}$, the area for dot two (2) of cell A5 is identified below as $A_{A5.2}$, etc. The MGI for ICP E1 and A5 ($MGI_{E1/A5}$) is as follows.

$$MGI_{E1/A5} = 100 * \frac{\left| \left[ \frac{A_{E1.1} + A_{E1.2} + A_{E1.3} + A_{E1.4} + A_{E1.5}}{5} \right] - \left[ \frac{A_{A5.1} + A_{A5.2} + A_{A5.3} + A_{A5.4} + A_{A5.5}}{5} \right] \right|}{2 * \pi r_p^2} - G_{pd}$$

A useful monochrome gain index (MGI) measurement includes the ICP in the first ICP group, i.e., the ICP including the color black (K) in combination with an unprinted substrate. This MGI is called the monochrome black gain index (MKGI). Another useful MGI measurement includes the ICPs in the second ICP group, i.e., the ICPs including the color of a substrate in combination with each of the colors C, M, Y, R, G, and B. This MGI is called the monochrome color gain index (MCGI). MKGI and MCGI are illustrated below.

Using the general equation for the gain index (GI), the equation for MKGI is of the form:

$$MKGI = 100 * \left[ \frac{|E4_d - D5_d|}{2 * \pi r_p^2} \right] - G_{pd}$$

wherein:

$E4_d$=mean area of the dots in cell E4;
$D5_d$=mean area of the dots in cell D5;
$r_p$=reference radius of a perfect dot (e.g., 0.05 inch); and
$G_{pd}$=percent gain due to the printer driver.

Using the general equation for the gain index (GI), the equation for MCGI is of the form:

$$MCGI = 100 * \left[ \frac{|[E1_d + E2_d + E3_d + E6_d + E7_d + E8_d] - [A5_d + B5_d + C5_d + F5_d + G5_d + H5_d]|}{6 * 2 * \pi r_p^2} \right] - G_{pd}$$

wherein:

$E1_d, E2_d, \ldots E8_d$=mean area of the dots in cells E1, E2, ... E8, respectively;
$A5_d, B5_d, \ldots H5_d$=mean area of the dots in cells A5, B5, ... H5, respectively;
$r_p$=reference radius of a perfect dot (e.g., 0.05 inch); and
$G_{pd}$=percent gain due to the printer driver.

A useful duochrome gain index (DGI) measurement includes the ICPs in the third ICP group, i.e., the ICPs including the color black (K) in combination with each of the colors C, M, Y, R, G, and B. This is referred to as the duochrome black gain index (DKGI). Another useful DGI measurement includes the ICPs in the fourth ICP group, i.e., the ICPs including combinations of each of the colors C, M, Y, R, G, and B. This is called the duochrome color gain index (DCGI). DKGI and DCGI are illustrated below.

Using the general equation for the gain index (GI), the equation for DKGI is of the form:

$$DKGI = 100 * \left[ \frac{|[D1_d + D2_d + \ldots + D8_d] - [A4_d + B4_d + \ldots + H4_d]|}{6 * 2 * \pi r_p^2} \right] - G_{pd}$$

wherein:

$D1_d, D2_d, \ldots D8_d$=mean area of the dots in cells D1, ... D8, respectively;
$A4_d, B4_d, \ldots H4_d$=mean area of the dots in cells A4, B4, ... H4, respectively;
$r_p$=reference radius of a perfect dot (e.g., 0.05 inch); and
$G_{pd}$=percent gain due to the printer driver.

Using the general equation for the gain index (GI), the equation for DCGI is of the form:

$$DCGI = 100 * \left[ \frac{|[B1_d + C1_d + \ldots + H7_d] - [A2_d + A3_d + \ldots + G8_d]|}{15 * 2 * \pi r_p^2} \right] - G_{pd}$$

wherein:

$B1_d, C1_d, \ldots H7_d$=mean area of the dots in cells B1, C1, ... H7, respectively;
$A2_d, A3_d, \ldots G8_d$=mean area of the dots in cells A2, A3, ... G8, respectively;
$r_p$=reference radius of a perfect dot (e.g., 0.05 inch); and
$G_{pd}$=percent gain due to the printer driver.

The raggedness index (RI) enables a user to determine the extent to which the edge of a printed character deviates from its ideal shape. With respect to test pattern 42, RI evaluates uneven wicking which occurs around the circumference of a printed dot on an unprinted substrate. In addition, RI evaluates uneven bleed which occurs around the circumference a printed dot on a printed background.

To determine RI, circularity (defined below) of a perfect dot is used. The perfect dot has a radius of, e.g., 0.05 inch, and a circumference of $2\pi r$, or approximately 0.314 in$^2$. A printed dot is often not perfect since its edge will have irregularities causing the circumference of the dot to be greater than 0.314 in$^2$. It is noted that the term "circumference" refers herein to the actual length of the outer boundary of the dot. As the irregularities in the boundary increase, the circumference increases (assuming that the area remains approximately the same or increases).

The RI is calculated by first determining the ratio of the mean circularity of the dots in a cell and the circularity of a perfect dot. One (1) is subtracted from the ratio to offset the circularity of a perfect circle to zero (0). The result is multiplied by one-hundred (100) to convert the unitless index to a percent. The percent is multiplied by ten percent (10%) to normalize the RI to match the numeric magnitudes encountered in the gain indices. The equation for the raggedness index (RI) has the general form:

$$RI = 100 * \left( \left( \frac{\sum_n C_d}{n} \right) - 1 \right) * 0.1$$

wherein:

$C_d$=circularity of a dot;
$C_p$=circularity of a perfect dot; and
n=total number of dots.

Circularity of a dot is determined by dividing the square of the circumference (c) of the dot by the area (A) of the dot. The equation for circularity ($C_x$) has the general form:

$$C_x = \frac{c_x^2}{A_x}$$

wherein x identifies a particular dot being analyzed.

The circularity of a perfect dot ($C_p$) is readily calculated to be $4\pi$, or approximately 12.57. The circularity and area of a printed dot is determined utilizing standard software functions defined within the image analysis application program 68.

The RI can be determined for a cell or group of cells having printed dots on an unprinted background. A raggedness index determined in this way is referred to herein as a monochrome raggedness index (MRI). Alternatively, the raggedness index can be determined for a cell or group of cells having printed dots on a printed background. A raggedness index determined in this way is referred to herein as a duochrome raggedness index (DRI). Similar to MGI and DGI, the term "chrome" is intended to indicate those colors generated by the application of ink, i.e., C, M, Y, K, R, G, and B, but not the color of the substrate.

Referring to FIG. 3, an example of the application of the general equation for monochrome raggedness index (MRI) is given below for the ICP E1 and A5 from the second ICP group. The monochrome raggedness index for ICP E1 and A5 ($MRI_{E1/A5}$) is as follows:

$$MRI_{E1/A5} = 100 * \left( \left( \frac{C_{E1} + C_{A5}}{2 * 4\pi} \right) - 1 \right) * 0.1$$

wherein:

$C_{E1}$=mean circularity of the dots in cell E1; and
$C_{A5}$=mean circularity of the dots in cell A5.

A useful MRI measurement includes the ICP in the first ICP group, i.e., the ICP including the color black (K) in combination with an unprinted substrate. This MRI is called monochrome black raggedness index (MKRI). Another useful MRI measurement includes the ICPs in the second ICP group, i.e., the ICPs including the color of a substrate in combination with each of the colors C, M, Y, R, G, and B. This MRI is called monochrome color raggedness index (MCRI). MKRI and MCRI are illustrated below.

Using the general equation for the raggedness index (RI), the equation for MKRI is of the form:

$$MKRI = 100 * \left( \left( \frac{C_{E4}}{4\pi} \right) - 1 \right) * 0.1$$

wherein:

$C_{E4}$=mean circularity of the black dots in cell E4.

Using the general equation for the raggedness index (RI), the equation for MCRI is of the form:

$$MCRI = 100 * \left( \left( \frac{C_{E1} + C_{E2} + C_{E3} + C_{E6} + C_{E7} + C_{E8}}{6 * 4\pi} \right) - 1 \right) * 0.1$$

wherein:

$C_{E1}, C_{E2}, \ldots C_{E8}$=mean circularity of the dots in cells E1, E2, . . . E8, respectively.

A useful duochrome raggedness index (DRI) measurement includes the ICPs in the third ICP group, i.e., the ICPs including the color black (K) in combination with each of the colors C, M, Y, R, G, and B. This is called duochrome black raggedness index (DKRI). Another useful duochrome raggedness index (DRI) measurement includes the ICPs in the fourth ICP group, i.e., the ICPs including combinations of each of the colors C, M, Y, R, G, and B. This is called duochrome color raggedness index (DCRI). DKRI and DCRI are illustrated below.

Using the general equation for the raggedness index (RI), the equation for DKRI is of the form:

$$DKRI = 100 * \left( \left( \frac{C_{D1} + C_{A4} + C_{D2} + \cdots + C_{H4}}{12 * 4\pi} \right) - 1 \right) * 0.1$$

wherein:

$C_{D1}, C_{A4}, C_{D2}, \ldots C_{H4}$=mean circularity of the dots in cells D1, A4, D2, . . . H4, respectively.

Using the general equation for the raggedness index (RI), the equation for DCRI is of the form:

$$DCRI = 100 * \left( \left( \frac{C_{B1} + C_{A2} + C_{C1} + \cdots + C_{G8}}{30 * 4\pi} \right) - 1 \right) * 0.1$$

wherein:

$C_{B1}, C_{A2}, C_{C1}, \ldots C_{G8}$=mean circularity of the dots in cells B1, A2, C1, . . . G8, respectively.

The non-uniformity index (NUI) provides a comparison of the non-uniformity of an ICP with the non-uniformity of its related solids inverse pair (SIP). The term "solids inverse pair" refers to an inverse pair consisting of two of the diagonal cells which have dots that are the same color as the background. As noted above, the diagonal cells are cells A1, B2, C3, D4, E5, F6, G7, and H8. An ICP and SIP are "related" when they each include the same color-pair. For example, ICP B1 (C dots on M background) and A2 (M dots on C background) are related to SIP A1 (C dots on C background) and B2 (M dots on M background). There are twenty-eight (28) possible NUIs in test pattern 42 illustrated in FIG. 3.

The NUI compares an ICP and its related SIP by taking the ratio of: the value corresponding to the non-uniformity of the ICP ($NU_d$); and the value corresponding to the non-uniformity of the ICP's related SIP ($NU_s$). The value corresponding to the non-uniformity of each pair (ICP and SIP) is determined by taking the difference between the mean gray-scale values in each pair's histogram. The ratio is then subtracted from one (1) and the result multiplied by 100 to convert it to a percentage.

The equation for the non-uniformity index (NUI) has the general form:

$$NUI = 100 \left( 1 - \left( \frac{NU_d}{NU_s} \right) \right)$$

wherein:

$NU_d$=non-uniformity of the ICP; and $NU_s$=non-uniformity of the related SIP.

Referring to FIGS. 8(a) and 8(b), an example is provided illustrating the derivation of the NUI for the ICP in the first ICP group, i.e., cells E4 and D5, and its related SIP, i.e., D4 and E5. The result is identified as $NUI_{K/S}$ Initially, the histograms of each inverse pair are generated. Color band selection 100 may be used prior to this step to select the color band to be used to compare the pairs. Thereafter, the mean gray-scale values of each color represented in each histogram is determined. For the example, the mean gray-scale values are 190 and 60 for the ICP (FIG. 8(b)) and 200 and 50 for the related SIP (FIG. 8(a)). The calculation of $NUI_{K/S}$ is as follows:

$$NUI_{K/S} = 100 \left( 1 - \left( \frac{|190 - 60|}{|200 - 50|} \right) \right) = 13.3\%$$

Those skilled in the art will recognize that the mean gray values for the ICP will tend to approach each other due to wicking. An extreme case occurs when the bi-nodal humps of the ICP histograms completely merge (appear as a single hump), resulting in an $NU_d$ equal to zero (0) and, therefore, an NUI equal to 100%.

The weighted sum (WS) is the sum of the above defined print defect indices, after weights have been applied to each, subtracted from one-hundred (100). Weightings can be based on determinations made through print testing or the preference of the user. For example, it may be decided that dot growth as measured by monochrome black gain index (MKGI) and monochrome color gain index (MCGI) should be more heavily weighted, therefore more closely monitored, than the other parameters. A weighted sum (WS) may then have the form:

WS=100−((0.2*MKGI)+(0.2*MCGI)+(0.1*DKGI)+(0.1*DCGI)+ (0.1*MKRI)+(0.1*MCRI)+(0.1*DKR)+(0.1*DCRI))

Various combinations of the print indices may be useful in generating a WS so to evaluate a particular printer. In addition, various weightings may be applied to emphasize printing properties of the substrate that are of interest to the user. Unlike the print defect indices described above, the WS is equal to 100% when print quality is perfect.

It is clear from the foregoing disclosure that the present system and method for print analysis provides an advancement in the art of image analysis. The system and method provides a test pattern having unique features that substantially reduce aliasing and the affects of the moiré effect during scanning. The test pattern also enables testing of multi-dimensional growth of printed characters due to wicking and bleed. In addition, the system and method provides custom software functions that work cooperatively with the test pattern for analyzing printing properties of a substrate. Further, custom software functions are provided that operate to enhance the accuracy of the print defect analysis results by ensuring the colors being analyzed are accurately distinguished.

While the system and method disclosed herein has been described with respect to various specific embodiments, those skilled in the art will readily appreciated that various modifications, changes, and enhancements may be made thereto without departing from the spirit and scope of the invention as defined by the appended claims.

What is claimed is:

1. A method for determining print defects of a test pattern formed on a substrate by a printing device, comprising:
   (a) generating a first cell of the test pattern on the substrate, wherein the first cell has a background of a first color and a pattern of a second color;
   (b) generating a second cell of the test pattern on the substrate, wherein the second cell has a background of the second color and a pattern of the first color;
   (c) converting the first and second cells into a digital representation thereof; and
   (d) analyzing at least a portion of the digital representation of the first and second cells to determine the print defects of the test pattern.

2. The method for determining print defects as recited in claim 1, wherein step (d) comprises
   determining a first mean area of the pattern of the first color;
   determining a second mean area of the pattern of the second color; and
   evaluating a difference between the first and second mean areas to calculate a gain index of the test pattern.

3. The method for determining print defects as recited in claim 1, wherein step (d) comprises
   determining a first amount of migration between the pattern of the second color and background of the first color;
   determining a second amount of migration between the pattern of the first color and the background of the second color; and
   evaluating a difference between the first and second amounts of migration.

4. The method for determining print defects as recited in claim 1, further comprising
   generating a third cell of the test pattern on the substrate, wherein the third cell has a background of the first color and a pattern of the first color; and
   generating a fourth cell of the test pattern on the substrate, wherein the fourth cell has a background of a second color and a pattern of a second color.

5. The method for determining print defects as recited in claim 4, wherein step (d) comprises
   (a) selecting a color-band for the first and second colors;
   (b) determining a first amount of the first color in the first and second cells from the selected color-band;
   (c) determining a second amount of the second color in the first and second cells from the selected color-band;
   (d) determining a third amount of the first color in the third and fourth cells from the selected color-band;
   (e) determining a fourth amount of the second color in the third and fourth cells from the selected color-band;
   (f) determining a non-uniformity index based on a ratio of a difference between the first and second amounts to a difference between the third and fourth amounts.

6. The method for determining print defects as recited in claim 1, wherein the patterns of the first and second colors each comprise a plurality of dots.

7. The method for determining print defects as recited in claim 6, wherein each of the plurality of the dots has a diameter of 0.1 inch.

8. The method for determining print defects as recited in claim 6, wherein step (d) comprises
   determining a mean circularity of the dots of at least one of the patterns; and
   determining a raggedness index by dividing the mean circularity by a predetermined value.

9. The method for determining print defects as recited in claim 6, wherein each dot of the pattern of the first color has a unique x and y coordinate.

10. The method for determining print defects as recited in claim 9, wherein each dot of the pattern of the second color has x and y coordinates that correspond to a dot of the pattern of the first color.

11. A method of assessing print quality of a printing device, comprising:
    (a) printing a test pattern onto a substrate using the printing device, wherein the test pattern comprises (i) a first cell having a background of a first color and a pattern of a second color and (ii) a second cell having a background of the second color and a pattern of the first color;
    (b) scanning the substrate having the test pattern printed thereon to generate a digital representation of the test pattern; and
    (c) analyzing at least a portion the digital representation of the test pattern to determine the print quality of the printing device.

12. The method of assessing print quality as recited in claim 11, wherein the patterns of the first and second colors each comprise a plurality of dots.

13. The method of assessing print quality as recited in claim 12, wherein the test pattern printed onto the substrate comprises a plurality of pixels and wherein diameters of the dots equal a whole number of pixels.

14. A method for determining print defects of a test pattern formed on a substrate by a printing device, wherein the test pattern comprises a first color and a second color, and wherein the method comprises:
    (a) separating the first color of the test pattern into at least two of the RGB color-bands;
    (b) separating the second color of the test pattern into the at least two of the RGB color-bands;
    (c) determining an amount of the first of the RGB colors for the first color;
    (d) determining an amount of the first of the RGB colors for the second color;
    (e) determining an amount of the second of the RGB colors for the first color;
    (f) determining an amount of the second of the RGB colors for the second color;
    (g) selecting a color-band based on the larger of
       (i) the difference between the amounts determined in steps (c) and (d) and
       (ii) the difference between the amounts determined in steps (e) and (f); and
    (h) determining the print defects of the test pattern based on the selected color-band.

15. The method for determining print defects as recited in claim 14, further comprising the step of determining a threshold value based on the color-band selected in step (g).

16. The method for determining print defects as recited in claim 14, wherein the test pattern comprises (a) a first cell having a background of the first color and a pattern of the second color and (b) a second cell having a background of the second color and a pattern of the first color.

17. A method for determining print defects of a test pattern formed on a substrate by a printing device, wherein the test pattern comprises a first color and a second color, and wherein the method comprises:
(a) separating the first color of the test pattern into at least one of the RGB color-bands;
(b) separating the second color of the test pattern into the at least one of the RGB color-bands;
(c) determining an amount of the RGB color-band for the first color;
(d) determining an amount of the RGB color-band for the second color;
(e) selecting a threshold value based on the amounts determined in steps (c) and (d); and
(f) determining print defects using the threshold value of the first and second colors.

18. The method for determining print defects as recited in claim 17, wherein the threshold value is approximately equal to the average of the amounts determined in steps 9(c) and (d).

19. A system for determining print defects of a test pattern formed on a substrate by a printing device, wherein the system comprises:
(a) a memory storing a first digital representation of the test pattern, wherein the test pattern comprises (i) a first cell having a background of a first color and a pattern of a second color and (ii) a second cell having a background of the second color and a pattern of the first color;
(b) a processor in communication with the memory, the printing device, and a scanner, wherein the processor is programmed to
print the test pattern onto the substrate using the printing device;
receive from the scanner a second digital representation of test pattern; and
analyze at least a portion of the second digital representation of the test pattern to determine the print defects of the test pattern.

* * * * *